Figure 1:
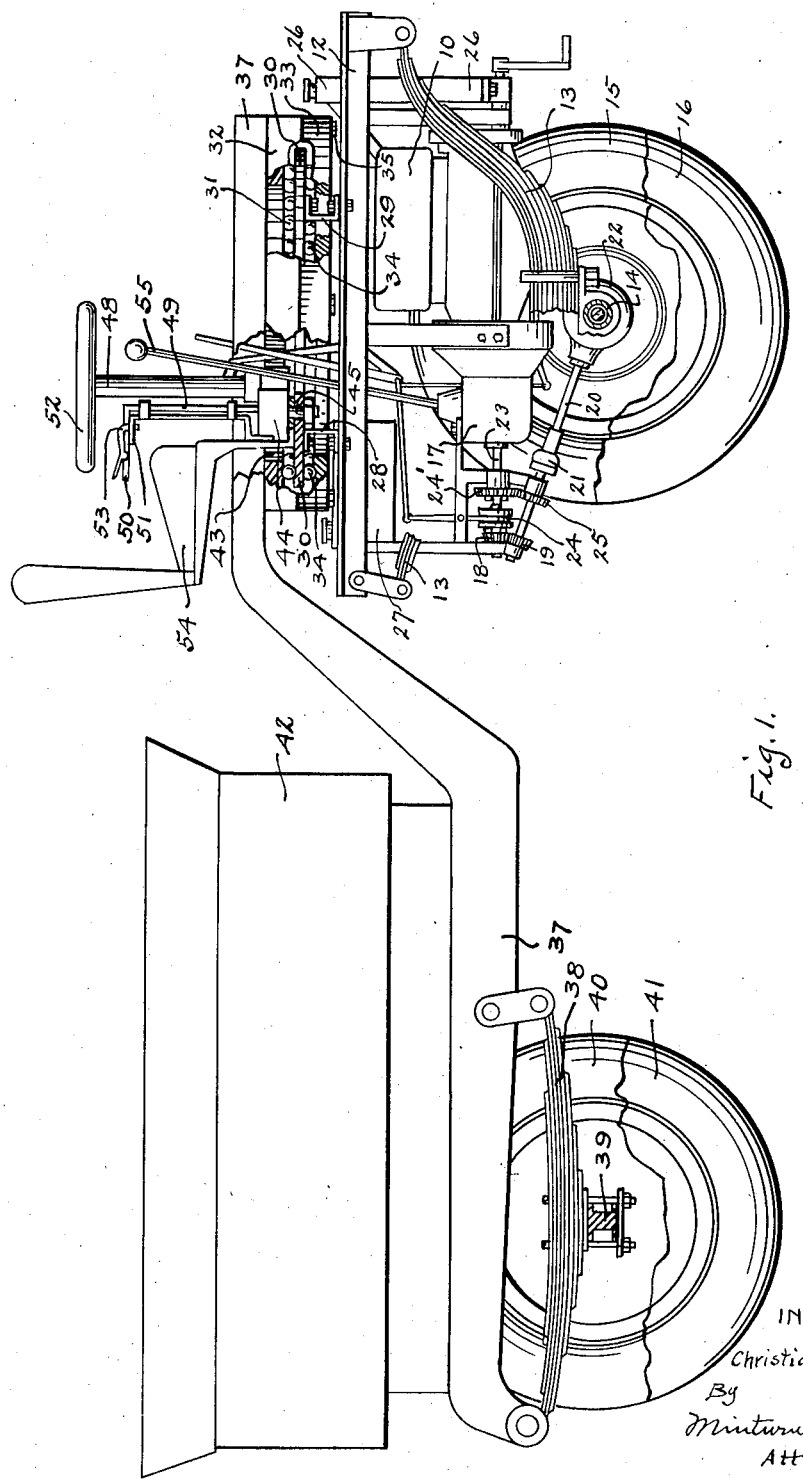

July 14, 1931. C. H. SCHLUNDT 1,814,635
MOTOR TRUCK
Filed Feb. 12, 1930 2 Sheets-Sheet 1

INVENTOR,
Christian H. Schlundt,
By
Minturn & Minturn,
Attorneys.

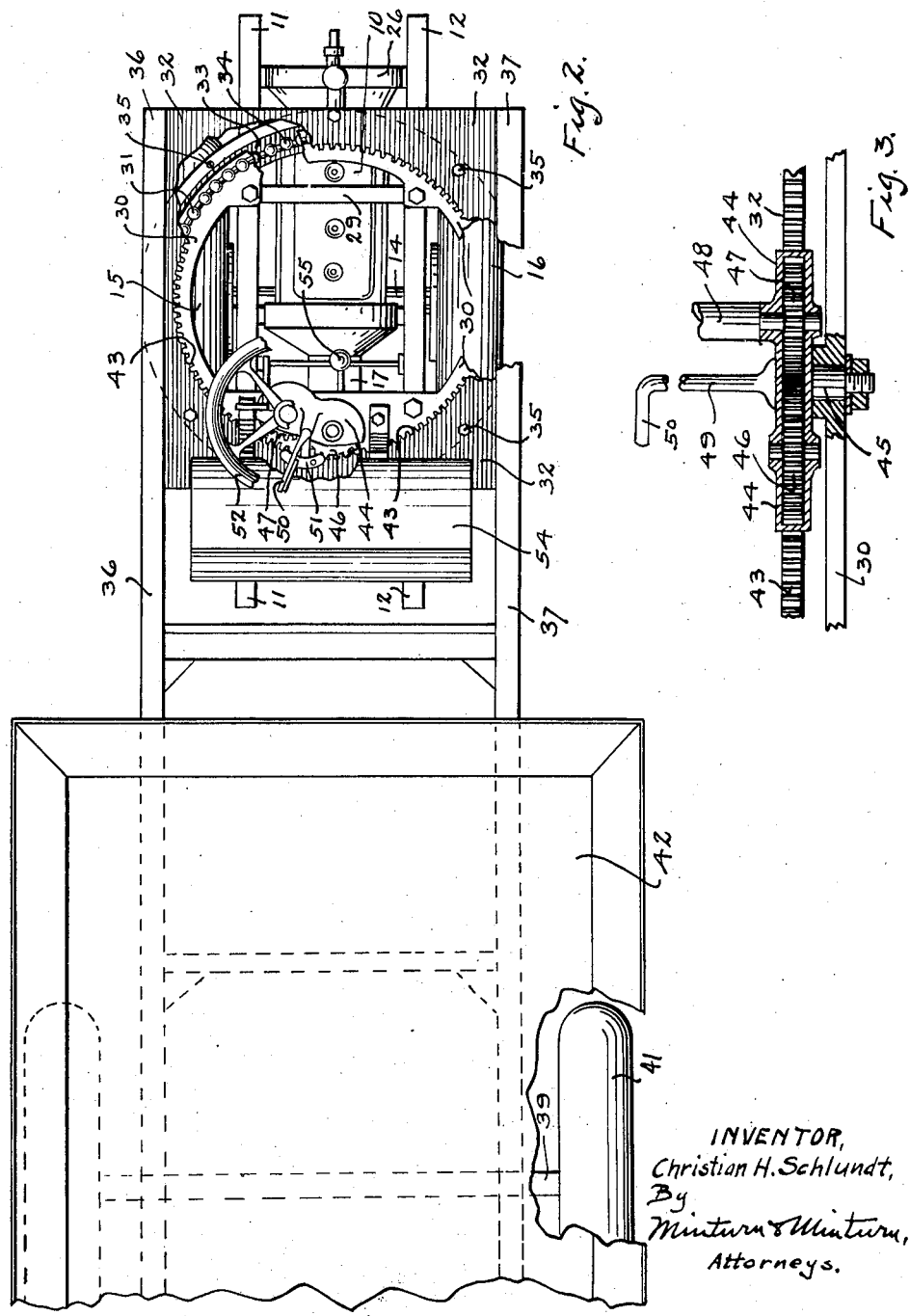

Patented July 14, 1931

1,814,635

UNITED STATES PATENT OFFICE

CHRISTIAN H. SCHLUNDT, OF INDIANAPOLIS, INDIANA

MOTOR TRUCK

Application filed February 12, 1930. Serial No. 427,742.

This invention relates to the art of motor trucks and has for its primary object the provision of a power unit revolvably attached to a load unit whereby the power unit may be completely revolved in either direction about one end of the load unit so that the direction of travel of the load unit may be reversed without turning the load unit around by the simple expedient of revolving the power unit.

Another important object is to provide a truck structure that may permit the operator's seat to revolve horizontally with and follow the direction of the steering wheel as the direction of travel of the load unit may be desired.

An important object of the invention also resides in the provision of a compact power plant unit completely assembled on two steerable wheels whereby power may be applied directly to the wheels throughout a complete circle of horizontal rotation of the wheels so that the wheels may be directed forwardly or rearwardly at any angle to the load unit connected therewith.

Other objects reside in the unique structure and various elements involved in the assembly to give a greater ease in handling a heavily loaded truck in close and difficult positions.

These and other objects will become apparent in the following description of the invention as illustrated in the accompanying drawings, in which—

Fig. 1 is a fragmentary side elevation of a truck embodying my invention;

Fig. 2, a fragmentary top plan view; and

Fig. 3, a detail on an enlarged scale in fragmentary elevation of the reversible steering mechanism.

Like characters of reference indicate like parts throughout the several views in the drawings.

I form a power unit by mounting an engine 10 between the rails 11 and 12 of a subframe which are supported in parallel horizontal relation, relatively close one to the other, by springs 13 resting on an axle 14 carried by the wheels 15 and 16. The engine 10 carries the usual change speed transmission within the housing 17, and by suitable gears 18 and 19, power is transmitted from the rear of the transmission to the axle 14 by a shaft 20 having a universal joint 21 therein to provide for the vertical displacement of the axle as permitted by the springs 13. The shaft 20 transmits power to the axle through the usual type of differential within the housing 22. The details of construction of the transmission and differential are well known to those versed in the art, and are not here shown, and do not constitute my invention. A different speed ratio between the transmission shaft 23 and the drive shaft 20 may be secured by shifting a collar 24 slidingly splined to the shaft 23 from engagement with the gear 18 which is revolvably carried on the shaft 23, to the gear 24' revolvably carried on the shaft 23 and in constant mesh with the gear 25 fixed on the shaft 20.

A suitable cooling radiator 26 is mounted at the forward end of the engine 10 and a fuel tank 27 is carried by a frame comprising the rails 11 and 12 above and at the rear of the engine. A pair of cross members 28 and 29 extend transversely of and are fixed to the rails 11 and 12, and bolted thereto is a ring 30 having ball bearing raceways cut annularly therearound on both its top and bottom sides.

Ball bearings 31 are carried in the raceway on the upper side on the ring 30, and a plate 32, here shown as having an outer rectangular shape and a central circular hole therethrough slightly larger in diameter than is the internal diameter of the ring 30, is positioned on the ring 30, to have that hole concentrically of the ring.

A raceway is formed on the under side of the plate 32 to receive the balls 31 therein. A clamping ring 33 having a ball raceway therearound on its top face carries balls 34 therearound and is brought up to have an annular shoulder about its periphery in contact with the under side of the plate and is bolted thereto by the bolts 35 whereby the ring 30 is revolvably supported and secured between the plate 32 and the clamping ring 33 by the balls 31 thereabove and the balls 34 below in rolling contact between the respective plate and rings.

A load carrying unit is formed comprising a frame including the side rails 36 and 37 carried by the springs 38 on the axle 39 which is supported by the wheels 40 and 41. A suitable bed or container 42 is mounted on the rails 36 and 37 and the forward ends of the rails are bent upwardly and forwardly to rest along on and be secured to the plate 32 so as to hold the plate in a fixed position relative to the frame rails 36 and 37. Since the plate 32 is bolted to the clamping ring 33 with the ring 30 therebetween and fixed to the subframe comprising the rails 11 and 12, the wheels 15 and 16 may revolve in a complete circle about a vertical axis passing through the center of the ring 30 and at the same time support the front ends of the rails 36 and 37, the power unit and load unit thereby being assembled to form a truck with the front wheels having a narrower tread than that of the rear wheels.

The hole through the plate 32 is formed with gear teeth 43 entirely therearound. On a plate extending from the ring 30, I mount a gear carrier 44 on a vertical pivot pin 45 to have the carrier rotatable in the plane of the plate 32. Within the carrier are mounted two spur gears 46 and 47 rotatably in constant mesh.

A steering post 48 is rotatably passed through the housing by its lower end and fixed in the gear 47, and a shaft 49 with a hand lever 50 on its upper end extends in a fixed relation from the carrier 44 to have the lever swing over a quadrant 51 just under the steering wheel 52 mounted on the top end of the post 48. The quadrant 51 is supported in a fixed relation to the ring 30 whereby shifting the lever 50 over the quadrant 51 will correspondingly rock the carrier 44 horizontally and selectively mesh the gear 46 or the gear 47 with the internal gear teeth 43. The lever 50 carries a dog 53 to engage the quadrant at the selected positions of the gears.

An operator's seat 54 is supported by the ring 30, and the control levers, such as the gear shift lever 55 and the like are extended through the ring 30 to be just forward of the seat. With the seat 54 and wheels 15 and 16 directed as shown, the truck may proceed in a straight line forwardly. The wheels 15 and 16 are steered by turning the steering wheel 52 in the direction in which the front end is to be turned. In the forwardly travelling positions, the gear 46 is thrown into mesh with the plate teeth 43 so that the wheel 52 may be turned in the direction to be followed by the truck. As the wheel 52 is turned, the gear 46 causes the gear 47 to be revolved and to travel around over the teeth 43 to move the ring 30 therealong and consequently turn the wheels 15 and 16 accordingly.

Now, when it is desired to reverse the direction of travel of the truck and turning space is limited, the wheel 52 may be revolved until the wheels 15 and 16 are completely turned and ready to be revolved in the reverse direction. The seat 54, by being mounted on the ring 30, of course remains behind the steering wheel 52 at all times and comes around in the reverse position to permit the operator to look directly back over the bed 42.

Should the operator then desire to steer the truck in reference to the rear or the front end, the lever 50 is shifted to swing the gear 46 out and the gear 47 into mesh with the teeth 43 so that the whel 52 may then be turned in the direction that the front end is to be directed.

The unique structure above described provides a front drive truck with front wheels that may be power driven at right angles to the load carrying frame or at any and all other angles thereto, there being no limit to the horizontal rotation of the wheels.

While I have here shown and described my invention in the one form as now best known to me, it is obvious that structural changes may be made therefrom without departing from the spirit of the invention, and I, therefore do not desire to be limited to that form, nor any more than may be required by the following claims.

I claim:

1. In a truck, the combination with a wheel supported frame, of a wheel supported sub-frame, a ring secured to the sub-frame, gear means to rotate the ring and sub-frame, means for shifting the gear means to permit reverse travel, a seat supported by the ring and power plant controls extending upwardly through the ring.

2. In a truck, the combination with a pair of rear wheels and a frame supported at its rear end by said wheels, of a pair of front wheels, a sub-frame carried by the front wheels, a power plant carried by the sub-frame, a bearing plate carried by the front end of said frame, a bearing ring rotatably contacting and secured to said plate to permit horizontal rotation of the ring around said plate, said bearing ring being secured to said sub-frame, gear means interposed between said plate and said ring, and means for rotating said gear to cause rotation of the ring relative to said plate, means for shifting said gear means to permit reverse travel, a seat supported by said ring, and power plant controls extending upwardly through said ring.

In testimony whereof I affix my signature.

CHRISTIAN H. SCHLUNDT.